US009471698B1

(12) United States Patent
Liu et al.

(10) Patent No.: US 9,471,698 B1
(45) Date of Patent: Oct. 18, 2016

(54) EMBEDDING, TRANSMITTING AND RECEIVING DATA IN AN AUDIO FILE

(71) Applicant: International Business Machines Corporation, Armonk, NY (US)

(72) Inventors: Ju Ling Liu, Beijing (CN); Yi Liu, Beijing (CN); Yicen Pan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/956,583

(22) Filed: Dec. 2, 2015

(51) Int. Cl.
*G06F 17/30* (2006.01)
*G06K 19/06* (2006.01)
*G10L 19/00* (2013.01)

(52) U.S. Cl.
CPC ... *G06F 17/30879* (2013.01); *G06K 19/06037* (2013.01); *G10L 19/00* (2013.01)

(58) Field of Classification Search
USPC ........................................................ 235/375
See application file for complete search history.

(56) References Cited

U.S. PATENT DOCUMENTS

| 8,306,811 | B2 | 11/2012 | Tewfik et al. | |
| 8,494,176 | B2* | 7/2013 | Suzuki | H04B 11/00 381/150 |
| 2014/0108252 | A1* | 4/2014 | Itwaru | G06Q 20/202 705/44 |
| 2014/0222438 | A1 | 8/2014 | Courtney, III et al. | |
| 2015/0006390 | A1 | 1/2015 | Aissi et al. | |
| 2015/0088495 | A1* | 3/2015 | Jeong | G01S 5/22 704/205 |

* cited by examiner

*Primary Examiner* — Christle I Marshall
(74) *Attorney, Agent, or Firm* — Walter L. Rudberg (57) ABSTRACT

Embodiments of the present invention provide a method and system for embedding, transmitting and receiving a Quick Response (QR) code in an audio file. Initially, a set of data representing a QR Code and an audio file is received. A third file is generated based on a combination of the QR code and the audio file. The third file is broadcasted and received by a device. Data representing the QR code is extracted from the third file and displayed as an object on the device.

18 Claims, 6 Drawing Sheets

FIG. 4 ic # EMBEDDING, TRANSMITTING AND RECEIVING DATA IN AN AUDIO FILE

BACKGROUND OF THE INVENTION

The present invention relates generally to the field of information distribution and, in particular, delivering information through an inaudible sound wave.

A Quick Response Code, commonly referred to as a QR code, is a matrix barcode. Generally a QR code is an optically scannable image, which often appears as an array of black squares arranged over a larger white square, which can be read by an imaging device. Typically a QR code contains embedded data, which may be extracted by a bar code reader program via an imaging device, which may then be utilized by a user. Due to their ease of use, QR codes are emerging as a popular medium of disseminating information. For example, QR codes are found in newspapers, magazines, brochures, store shelves, billboards, business cards, etc. as industry often tends to look for new resources to expand their outreach to potential customers and clients.

SUMMARY

According to one embodiment of the present invention, a method is provided, comprising: receiving, by one or more processors, a first file and a second file, wherein the first file comprises a set of data representing a Quick Response (QR) Code, and wherein the second file comprises an audio file; generating, by one or more processors, a third file, wherein the third file comprises a set of data representing the first file combined with the second file; receiving, by one or more processors, the third file, wherein the third file is received on a device; extracting, by one or more processors, on the device, data associated with the first file from the third file, wherein extracting the data associated with the first file, further comprises converting the data associated with the first file into the set of data representing the QR code; and displaying, by one or more processors, the set of data representing the QR code as an object.

Another embodiment of the present invention provides a computer program product for transmitting a QR code, based on the method described above.

Another embodiment of the present invention provides a computer system for transmitting a QR code, based on the method described above.

DETAILED DESCRIPTION

Quick Response (QR) codes provide a common medium to deliver information to a user. Traditional QR codes are conveyed by the QR image itself, requiring a user to scan the code manually by an optical scanner on a device. Often, QR codes contain a URL address, allowing an individual to acquire more information about the product or item scanned. Alternatively, QR codes may contain text, phone numbers, email addresses, calendar events, and the like. A QR code can be placed on almost any object about which users might want additional information. For example, QR codes may store addresses and URLs appearing in magazines, on signs, on buses, on business cards etc. For instance, while waiting at a bus stop, a user may scan a QR code containing a URL link which provides the user information regarding the arrival time of the next bus. In another example, a business card containing a QR code, when scanned may electronically input the contact information of the business card into ones smart mobile device.

Embodiments of the present invention provide systems and methods for generating and receiving a QR code over audio waves.

Embodiments of the present invention provide a system and method which embeds an audio file of a QR code into a sound file and disseminates the sound file to the public. Embodiments of the present invention provide a system and method for converting a QR code into a sound wave. Additionally, embodiments of the present invention provide a system and method for embedding a QR code signal into an audio file and broadcasting the sound file to a set of listeners and their corresponding smart devices, and then extracting the QR code signal from the broadcasted sound, on a user's smart device. Additionally, embodiments of the present invention provide embedding a QR code signal in an inaudible frequency.

The human audio spectrum typically ranges between 20 Hz through 200 kHz. Therefore, embodiments of the present invention embed the QR code within the low frequency region of the audio spectrum. In an embodiment, since humans are generally not sensitive to all sound frequency, a sound wave that is inaudible to a human, representing a QR code, may be utilized. For example, since humans are generally not sensitive to low frequency sounds, a low frequency sound wave representing a QR code, may be utilized.

In general, a bar code contains information and read by an optical machine. In addition to QR codes, there are additional types of bar codes such as the Universal Product Code, which may be included as an embodiment of the present invention.

In an embodiment QR codes store information in binary data. Therefore it is possible to store all kinds of information within a QR code.

Figure 1:
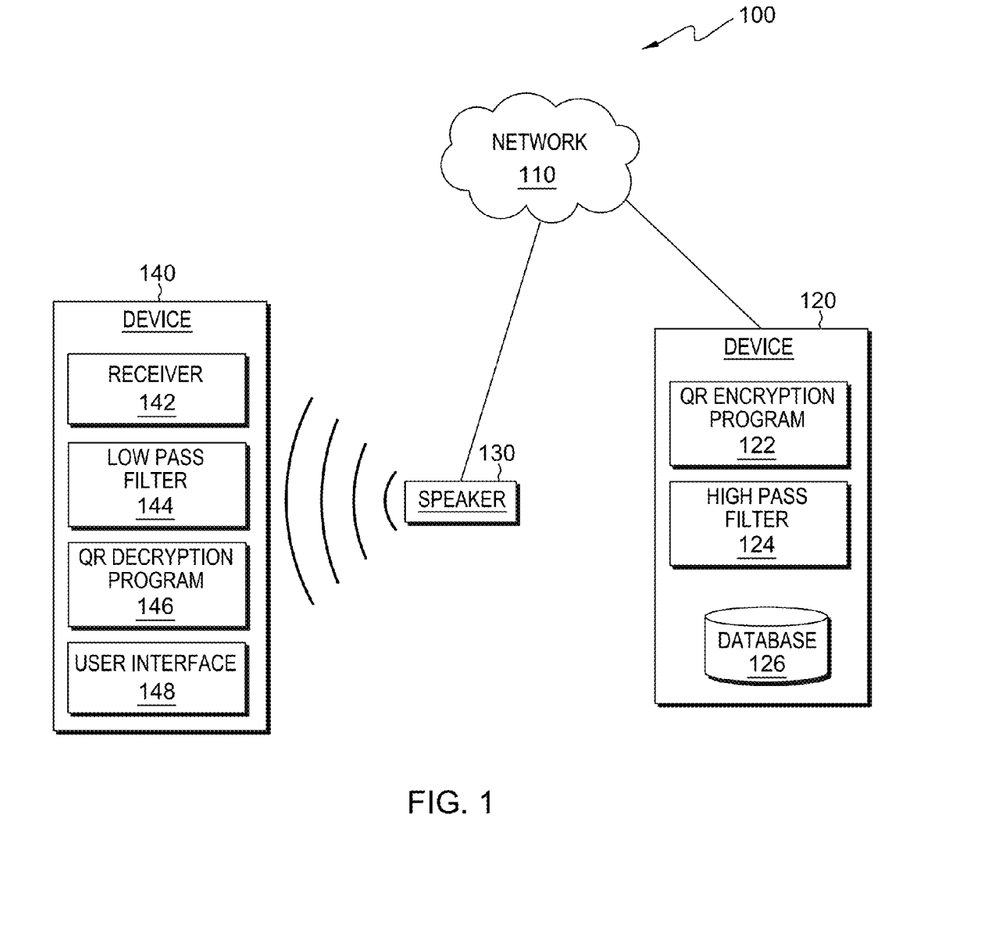
FIG. 1 is a functional block diagram illustrating a QR signal transmission, in accordance with an embodiment of the present invention.

The present invention will now be described in detail with reference to the Figures. FIG. 1 is a functional block diagram illustrating a signal transmission environment, generally designated 100, in accordance with an embodiment of the present invention. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims. In this exemplary embodiment, signal transmission environment 100 includes server 120, and speaker 130, connected over network 110, as well as device 140 receiving sound waves from speaker 130.

Network 110 may be a computer network with a small geographic scope. Computer networks with a small geographic scope range from NFC to Local Area Networks (LANs). A computer network with a small geographic scope typically does not have a connection to the Internet or other remote networks. In an alternative embodiment, network 110 is not intended to be limited to a small geographic scope, rather network 110 may include a larger networking environment. For example, network 110 may be used for communication among mobile devices themselves (intrapersonal communication) or for connecting to a higher level network (e.g., the Internet). A wireless personal area network (WPAN) is a Network carried over wireless network technologies such as BLUETOOTH® or peer-to-peer communications over a wireless LAN (Bluetooth is a registered trademark of Bluetooth SIG, Inc.). Network 110 architecture may include one or more information distribution network(s), of any type(s) such as for example, cable, fiber, satellite, telephone, cellular, wireless, etc., and as such, may be configured to have one or more communication channels. In another embodiment, network 110 may represent a "cloud" of computers interconnected by one or more networks, where network 110 is a computing system utilizing clustered computers and components to act as a single pool of seamless resources when accessed.

The various aspects of network 110 are not limited to radio frequency wireless communications; rather, communication may be accomplished via any known mediums in the art, including but not limited to, acoustic mediums, and optical mediums, such as, visible or infrared light or ultrasound. For example, data exchanged between devices, may be transmitted via infrared data links using well known technologies, such as infrared transceivers included in some mobile device models.

In the exemplary embodiment, server 120 is a server computer. In other embodiments, server 120 may be a management server, a web server or any other electronic device capable of receiving and sending data. In another embodiment, server 120 may represent a server computing system utilizing multiple computers as a server system, such as in a cloud computing environment. Server 120 contains QR encryption program 122, high pass filter 124 and database 126.

In an embodiment, QR encryption program 122, converts a received QR code and/or file into an audio file. In an embodiment, QR encryption program 122 may additionally, embed the QR code into a received audio file. In an embodiment the received QR code may be a data file containing the information contained within a pictorial QR code. In an embodiment, the received QR code may be an actual pictorial QR code, which is scanned by a device associated with server 120. In an embodiment, the QR code may be created by a user though a user interface (not shown) associated with server 120. The received audio file may be a musical song.

QR encryption program 122 may convert the received QR code into binary coding. For example, the binary coding of a QR code is represented by 1's and 0's. QR encryption program 122 may represent a 1 with an audio pulse and a 0 with silence. Thereby the QR code is converted into a sound wave of pulses and pauses. In an embodiment, QR encryption program 122 may convert the QR code into binary and associate the 1's and 0's with differing frequencies.

In an embodiment, QR encryption program 122 may also direct a received audio file to high pass filter 124, in order to attenuate low frequency data from an audio file. In an embodiment, QR encryption program 122 may embed a QR code into a received audio file.

Figure 2A:
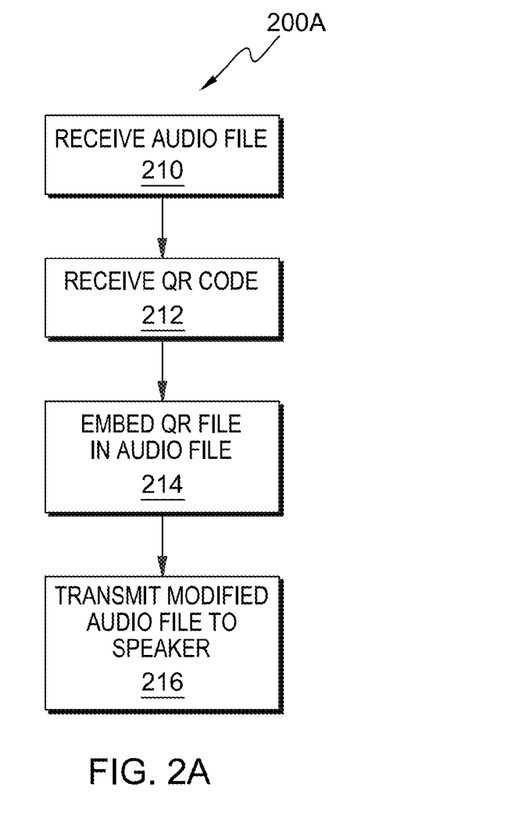
FIG. 2A is a flow chart illustrating operational steps for embedding a QR code in an audio file in accordance with an embodiment of the present invention.

QR encryption program 122 is described in detail with reference made to Flowchart 200A, found below.

Figure 3A:
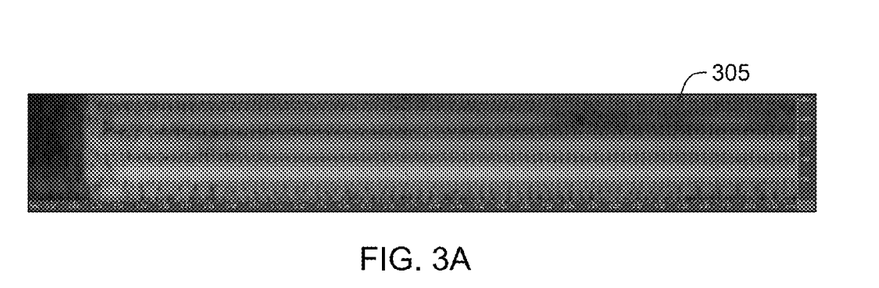
FIGS. 3A-F are exemplary sound waves, in accordance with an embodiment of the present invention.
Figure 3B:
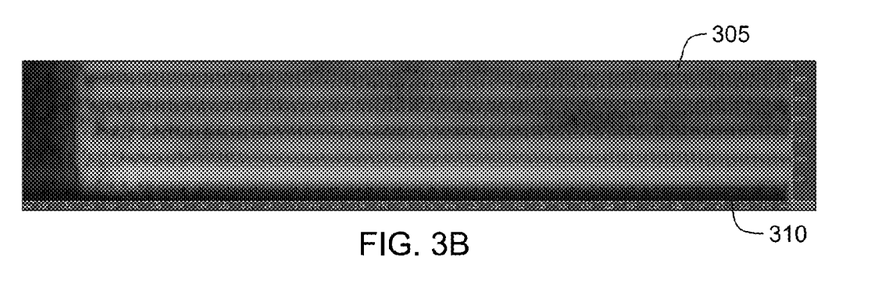

High pass filter 124 is an electronic filter which attenuates low frequency data from an audio file. Specifically, high pass filter 124 attenuates signals with frequencies lower than a predetermined cut off frequency, while higher frequencies pass through the filter, unaffected. For instance, high pass filter 124 acts as a sieve, wherein electrical impulses of sound frequency higher than the cut off frequency pass through the sieve, while low end frequency at or below the cut off frequency are trapped, thereby removing a specific low end frequency range from the acoustic sound file. For example, if high pass filter 124 has a cut off frequency at or below 50 Hz, then no frequency at or below 50 Hz is produced, while any frequency above 50 Hz passes through the filter unaffected. Since the human audio spectrum low end range is approximately 20 Hz, a frequency cut off of 50 Hz may not be perceptible to the human ear. An exemplary before and after image of a sound wave passing through high pass filter 124 is depicted in FIG. 3A and FIG. 3B, respectively. For example, sound wave 305 is whole in FIG. 3A, however in FIG. 3B, sound wave 305 is attenuated as it is missing frequency at or below 50 Hz, as demonstrated by area 310.

Database 126 is not limited to databases, rather, database 126 may be used as an information repository. Database 126 may include any suitable volatile or non-volatile computer readable storage media, and may include random access memory (RAM) and cache memory (not depicted in FIG. 1). QR encryption program 122 may be stored in a persistent storage component (not depicted) for execution and/or access by one or more of processor(s) via one or more memories (for more detail refer to FIG. 4). Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information.

Database 126 can be implemented using any database architecture known in the art such as, for example, a relational database, an object-oriented database, and/or one or more tables. Database 126 stores actual, modeled, predicted, or otherwise derived patterns of movement based on sensor data. Database 126 may contain lookup tables, databases, charts, graphs, functions, equations, files and the like that QR encryption program 122 may access to embed a QR code signal within a received audio file. Information stored in database 126 may include: various geographical locations, audio files, audio/video files, QR files, and the like. While depicted on server 120, in the exemplary embodiment, database 126 may be on a remote server or a "cloud" of computers interconnected by one or more networks utilizing clustered computers and components to act as a single pool of seamless resources, accessible to QR encryption program 122 via network 110.

Speaker 130 converts electrical audio signal into corresponding sound. Speaker 130 may be any device capable of receiving an electrical audio signal and converting the signal into a corresponding sound, via sound waves. Speaker 130, may be any kind of speaker known in the art, such as, a vacuum tube, dynamic loudspeaker, flat panel speaker, plasma arc speaker etc. Speaker 130 may be connected to additional components, not shown, which receives an audio signal from server 120 and forwards the signal to speaker 130. Speaker 130 may also be connected to an amplifier, not shown, to amplify the signal received from server 120. Speaker 130 may be capable of propagating sound waves beyond the human audio spectrum. For example, speaker 130 may propagate a sound wave below a frequency range of 20 Hz and/or above a frequency range of 20 kHz. In an alternative example, speaker 130 may propagate a sound wave within a frequency range of 20 Hz-20 kHz. In an alternative example, speaker 130 may propagate only low frequency sound waves.

Device 140 is to be interpreted broadly. Exemplary embodiments of device 140 include, but are not limited to, a smart watch, a smart phone, a tablet, a laptop, a netbooks, handheld computers, personal organizers, e-reading devices, gaming devices or a computer. In an embodiment, device 140 may only receive data. In an alternative embodiment device, 140 may receive and transmit data. In an embodiment, device 140 may not be connected to network 110. Alternatively, in another embodiment, device 140 may be connected to network 110. Device 140 includes receiver 142, low pass filter 144, QR decryption program 146, and user interface 148. Device 140 may include additional components not shown.

In some embodiments, device 140 may contain speaker 130, and propagate the audio sound waves received from server 120 to additional devices (not shown). The concepts disclosed and discussed herein, may be applied to both a standalone device 140, as well as a device that also functions as a speaker transmitting the sound wave to a plurality of additional devices 140.

Receiver 142 detects the acoustic sound projected from speaker 130, and converts the sound waves into electrical impulses on device 140. Specifically, receiver 142 receives sound waves and converts the information carried by the sound waves into a usable form. Receiver 142 may act as a sensor as it converts sound waves into electrical energy variations, which may then be filtered, amplified, transmitted, recorded etc. Examples of receiver 142 may be a microphone.

Receiver 142 may be internal to device 140. Alternatively, receiver 142 may be external to device 140, wherein device 140 and receiver 142 are able to communicate with one another. Receiver 142 catches the sound wave propagating from speaker 130 and converts the waves into information utilizable by QR decryption program 146, to detect embedded QR code signals.

Figure 3C:
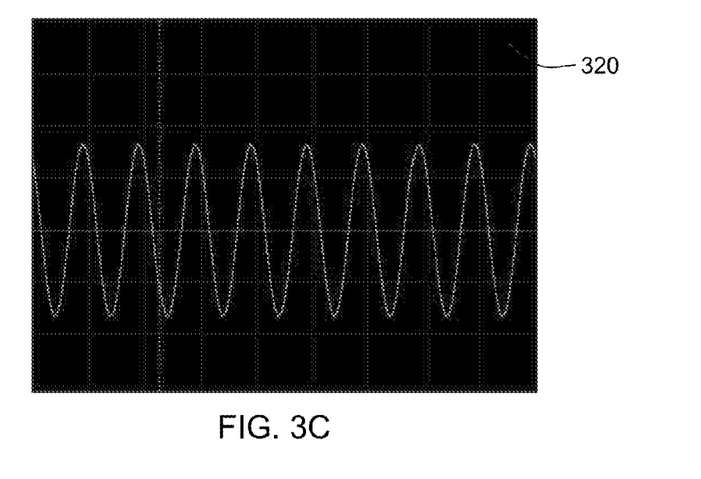
Figure 3D:
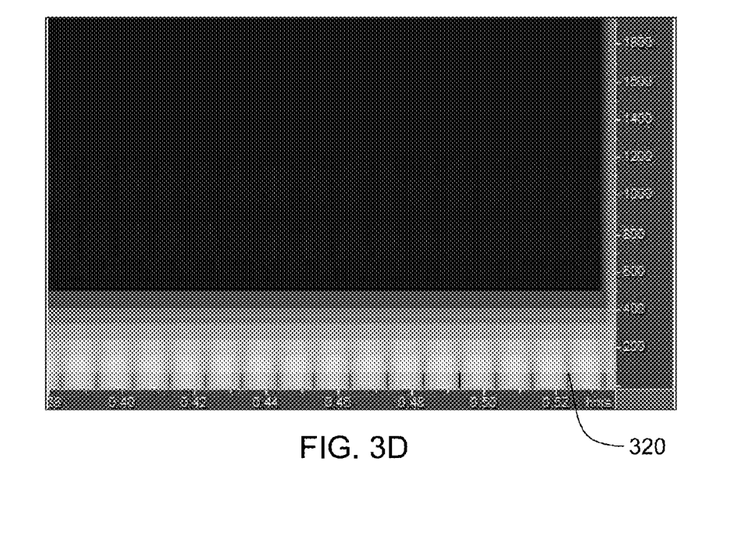
Figure 3E:
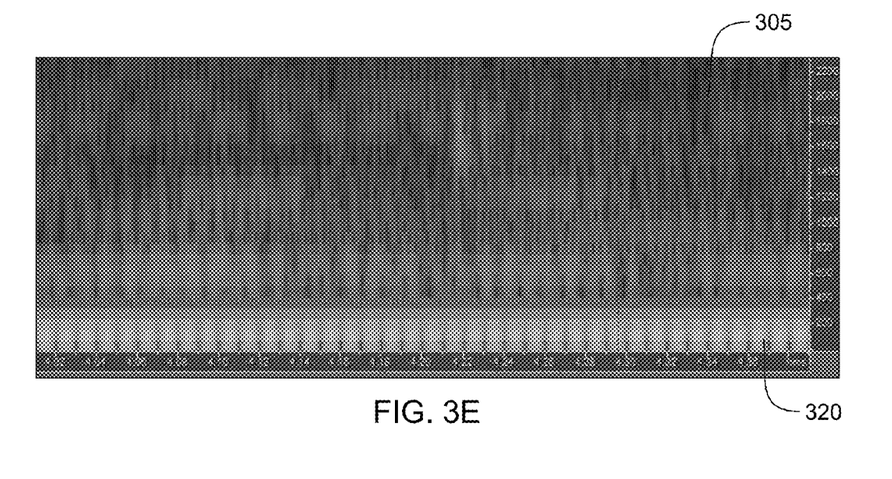
Figure 3F:
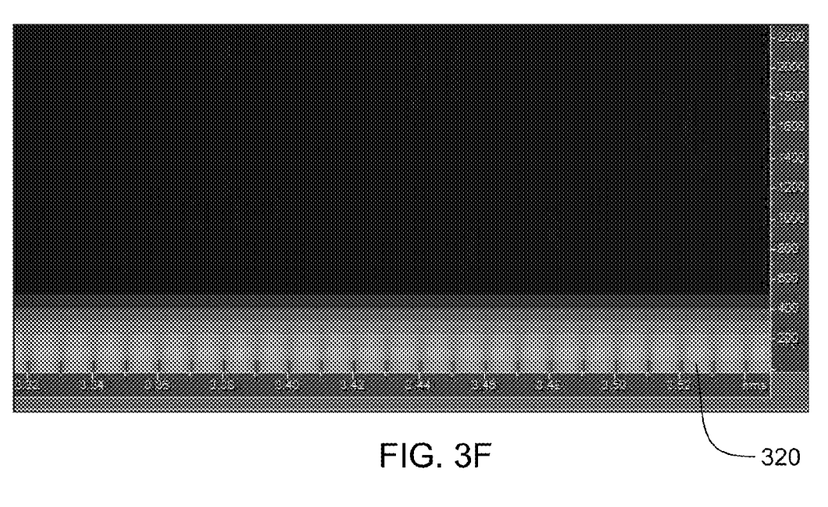

Low pass filter 144 acts as the opposite of high pass filter 124. Low pass filter 144 is an electronic filter which passes signals with a frequency lower than a certain cutoff frequency and attenuates signals with a frequency higher than the cut off frequency. For example, if low pass filter 144 has a cut off frequency at 50 Hz, then frequencies at or below 50 Hz are captured and retained, while any frequency above 50 Hz passes through the filter unaffected. The frequencies retained (in the previous example, at or below 50 Hz) are the electronic QR signals embedded into the audio signal via QR encryption program 122. An exemplary before and after image of a special sound wave (containing both sound wave 305 and QR code tone 320) passing through low pass filter 144 is depicted in FIG. 3E and FIG. 3F, respectively.

QR decryption program 146, exploiting the frequency filtered from low pass filter 144, extracts the hidden QR code signal within the received sound waves. QR decryption program 146 analyzes the data from low pass filter 144 to determine the embedded QR code data. Specifically, QR decryption program 146 searches the received low end frequency for the embedded QR code signal and converts such signal into a useful form to be delivered to the user of device 140. For example, if the embedded QR code is in binary coding, then reconstructing the received audio signal back into binary may be represented as an audio pulse represents 1, while silence represents 0, thereby converting the 1's and 0's into a QR code and then constructing the embedded data.

Figure 2B:
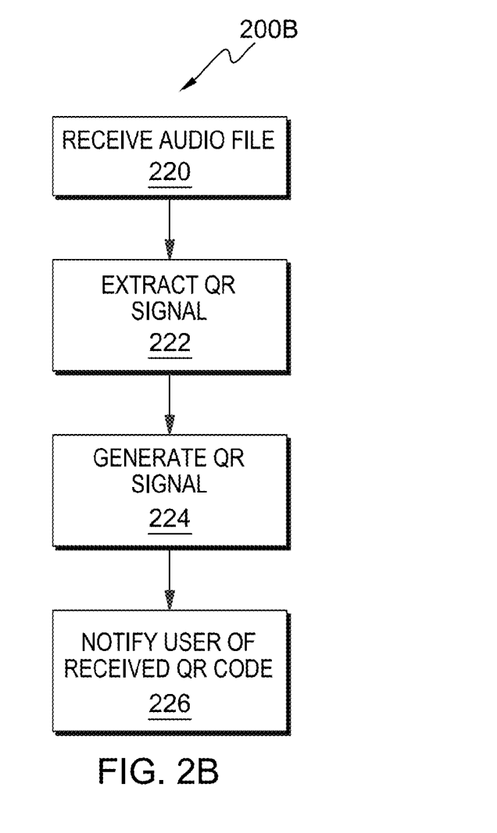
FIG. 2B is a flow chart illustrating operational steps for decrypting a QR code in an audio file, in accordance with an embodiment of the present invention.

QR decryption program 146 is described in detail with reference made to Flowchart 200B, found below.

User interface 148, of device 140 is to be interpreted broadly. In an embodiment, user interface 148 allows a user of device 140 to interact with a received QR code signal. User interface 148 provides an interface between a user and the received QR code. Generally a user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation.

Reference is now made to FIG. 2A and FIG. 2B. FIG. 2A contains flowchart 200A, illustrating the operational steps for embedding a QR code in an audio file in accordance with an embodiment of the present invention. FIG. 2B contains flowchart 200B, illustrating the operational steps for decrypting a QR code in an audio file, in accordance with an embodiment of the present invention.

Generally, flowchart 200A represents the QR encryption program 122 embedding a QR code signal into an audio sound file.

In step 210, QR encryption program 122 receives an audio file. The audio file may include a video component and/or additional aspects known in the art. For example, FIG. 3A represents original sound wave 305 over a period of time, received from a user. The audio file may be that of a musical song, a TV advertisement, TV shows, radio commercials, radio broadcasts, Internet streaming audio, etc. Simply, any audio file may be utilized within the scope of the invention, to the extent that one wishes to embed a QR code into the audio file.

In step 212, QR encryption program 122 receives a QR code. In an alternative embodiment, QR encryption program 122 in step 212, might create a QR code. FIG. 3C and FIG. 3D represents a generated QR code in an audio frequency. For example, using a low frequency tone generated, the QR code may be generated. FIG. 3C illustrates a 50 Hz sine signal as a sample. FIG. 3D represents the QR code spectrum.

Once the QR code is received, QR encryption program 122 converts the QR code data file into a data file that may be distributed over sound waves. In an exemplary embodiment, QR encryption program 122 may convert the received QR code into binary coding. For example, the binary coding of a QR code is represented by 1's and 0's. QR encryption program 122 may represent a 1 with an audio pulse and a 0 with silence. Thereby the QR code is converted into a sound wave of pulses and pauses. In another exemplary embodiment QR encryption program 122 may convert the QR code into binary and associate the 1's and 0's with differing frequencies.

Generally, QR encryption program 122 converts the QR code to a low frequency closely matching to the high pass filter cut off. The low frequency of the QR code may still be audible to a human. Alternatively, the low frequency of the QR code may not be audible to a human. However, the low frequency of the QR code may should still be within a frequency range, similar to that of speaker 130. For example, if the high pass filter cut off is set at 50 Hz, then the QR code is placed in that approximate low range.

It is noted that one of ordinary skill in the art will appreciate that steps 210 and 212 may occur simultaneously or in reverse order. For example, QR encryption program 122 may receive the audio file of step 212 prior to receiving the QR code in step 210. Since QR encryption program 122 embeds the QR code in an audio file, it may not matter the order in which QR encryption program 122 receives each item.

In step 214, QR encryption program 122 embeds the received QR file (from step 212) into the received audio file (from step 210). Initially, the received audio file is passed through a high pass filter, (as shown in FIG. 1, high pass filter 124). The high pass filter removes low frequency signal below the cut-off point. Ideally, the removed low frequency signal is below the audible range of a human. For example, passing the audio file through a high pass filter with a cut off of 50 Hz, any acoustic loss is not noticeable to a human as the human audio spectrum ranges between 20 Hz-20,000 Hz. Those skilled in the art will appreciate that additional cut off frequencies may be used, however the cut off frequency should not remove any audio on the high end but still be playable through modern speakers. Therefore, using the above example, the frequency gap between 20 Hz and 50 Hz, is very low on the audio spectrum, and should not be detectable by a human ear. In an embodiment, FIG. 3B represents the same sound wave of FIG. 3A, sound wave 305 (of step 210), after passing through a high pass filter, similar to that of high pass filter 124. The sound wave illustrated in FIG. 3B has low frequency signal, of approximately less than 50 Hz attenuated 310.

After the audio file is passed through a high pass filter, the audio file remains intact starting at 50 Hz. QR encryption program 122 will embed the QR code signal into the audio file. The QR code signal should adequately fit in the low range of audio files which was removed via the high pass filter. Mixing the QR code signal with the high pass filtered audio file creates a special audio file with the embedded QR code. Thus, the QR code is hidden within the low frequency of the sound file when played through a speaker. For example, FIG. 3E represents an exemplary, special audio file, as a QR code tone 320, as depicted in FIG. 3D, is combined with sound wave 305 of FIG. 3A. The new file created in FIG. 3E contains both the original file and the QR file, both in an audio file. Those skilled in the art will appreciate there are numerous methods to mix two audio files together.

Reference is now made to FIG. 2B. Generally, flowchart 200B represents QR decryption program 146 as the program extracts the QR code from a received audio wave and displays the information to the user of device 140. Specifically, Flowchart 200B portrays QR decryption program 146, located on device 140 (or on a separate device in communication with device 140) extracting the QR code signal from a received audio file.

In step 220, QR decryption program 146 receives the modified audio file. For example, device 140 catches the audio being played from speaker 130. Receiver 142 on device 140 may continually search for audio sounds, and subsequently forward the audio signal of QR decryption program 146. Alternatively, QR decryption program 146 may continually search audio signals received from receiver 142, and subsequently process all audio sounds testing whether the received sound contains a hidden QR code. QR decryption program 146 may detect automatically whether the audio source contains a QR code. Alternatively, receiver 142 may require input by a user to tell it to detect for an audio sound.

Once an audio sound is acquired, in step 222, QR decryption program 146 utilizes a low pass filter on the received audio signal to extract the QR signal. The low pass filter attenuates signals with a frequency higher than the cut off frequency, and retains the low frequency signal. The cut off frequency of the low pass filter should match closely the cut off frequency of the high pass filter. Thereby, the frequencies retained after the audio file passes through the low pass filter should be an almost identical match to that of the QR signal embedded into the audio signal via step 214. For example, FIG. 3F represents the sound wave of FIG. 3E, after passing through a low pass filter, similar to that of low pass filter 144. Therefore, once the received audio file is passed through the filter, the remaining audio file is the QR code tone 320.

In step 224, QR decryption program 146 interprets the QR code from the QR code signal. For example, QR decryption program 146 generates the QR code from the low frequency QR code signal. For instance, if the embedded QR code is in binary coding, then reconstructing the received audio signal back into binary may be represented as an audio pulse represents 1, while silence represents 0, thereby converting the 1's and 0's into a QR code and then constructing the embedded data.

In step 226, the generated QR code is pushed to the user. For example, user interface 148, on device 140, transmits a notification to the user that a QR code was received, inviting the user to review the contained information. In another example, user interface 148, automatically opens the QR code and notifies the user of device 140. Once the user is notified, the user may have the option to open, review, ignore, etc. the QR code.

Reference is now made with respect to FIGS. 3A-F. FIGS. 3A-F represent the manipulation of an exemplary sound wave and QR code, in accordance with an embodiment of the present invention.

FIG. 3A represents original sound wave 305 over a period of time, received from a user.

FIG. 3B represents same sound wave 305 (of FIG. 3A), after passing through a high pass filter, similar to that of high pass filter 124. Sound wave 305 illustrated in FIG. 3B has its low frequency attenuated 310, at approximately 50 Hz FIG. 3C and FIG. 3D represents an exemplary generated QR code tone 320 in an audio frequency. For example, using a low frequency tone generated, the QR code may be generated. FIG. 3C illustrates a 50 Hz sin signal as a sample. FIG. 3D represents the QR code spectrum.

FIG. 3E represents the QR code tone 320 embedding and mixed in with the original sound wave 305 of FIG. 3B. The new file created in FIG. 3E contains both the original sound wave 305 and the QR code tone 320 file, both in a singular audio file.

FIG. 3F represents the same sound wave of FIG. 3E, after passing through a low pass filter, similar to that of low pass filter 144. In an embodiment, FIG. 3F illustrates, on a client side, the decoding process of the QR code tone 320. For instance, a client's smart device, similar to device 140, catches the sound wave, represented in FIG. 3E. The sound wave passes through a low pass filter to obtain the QR code tone 320 signal.

In accordance with an embodiment of the present invention, one exemplary embodiment, may encompass, a radio station emitting an embedded QR code during its broadcast. For example, the QR code may contain information relating to a sweepstakes or contest promoted by the radio station. Alternatively, the QR code may contain information about the artist, song or a link to discover more information regarding the subject matter being discussed during the broadcast.

Similarly, a television broadcast, either a show, or commercial may utilize a similar embodiment. For example, a commercial may contain a hidden QR code allowing one watching the commercial to find out more about the product being offered. Similarly, during a news program, the news may include a QR code containing a URL link to a written news article further explaining the topic at issue. In a similar embodiment, a TV show may embed a QR code in the show allowing a TV watch easier access more information about the TV show.

In accordance with another embodiment of the present invention, one exemplary embodiment, may encompass, retail stores embedding a QR code within background music played at the store. In this situation, the QR code may promote various sale items, a URL link to find out more information about a product, coupons, or an alternative way to access the retail stores website than typing the specific URL.

Similarly, a restaurant may utilize a similar embodiment by promoting various specials on their menu.

Figure 4:
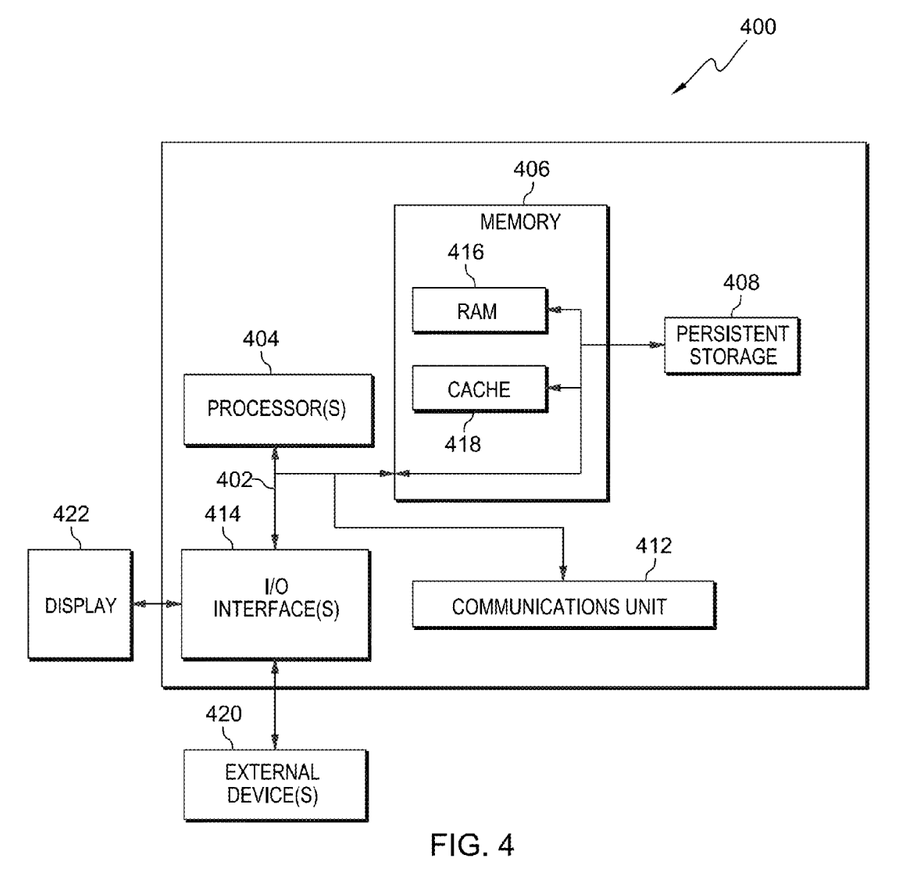
FIG. 4 is a block diagram of the internal and external components of a computer system, in accordance with an embodiment of the present invention.

FIG. 4 depicts a block diagram of internal and external components of a device 400, such as device 140 and server 120 of FIG. 1, in accordance with an illustrative embodiment of the present invention. It should be appreciated that FIG. 4 provides only an illustration of one implementation, and does not imply any limitations with regard to the environments in which different embodiments may be implemented. Many modifications to the depicted environment may be made.

Device 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media.

For example, QR encryption program 122 and/or QR decryption program 146 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. QR encryption program 122 and/or QR decryption program 146 may be downloaded to persistent storage 408 through communications unit 412.

I/O interface(s) 414 allows for input and output of data with other devices that may be connected to device 400. For example, I/O interface 414 may provide a connection to external devices 420, such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, a first file that includes a set of data representing a Quick Response (QR) Code, and a second file that includes audio data;
   generating, by the one or more processors, a third file, that includes the audio data of the second file where a low frequency of the audio data is attenuated, wherein the attenuated low frequency is less than or equal to the low frequency region of the human audio spectrum;
   embedding, by the one or more processors, the set of data representing the QR Code into data representing a tone in the low frequency;
   inserting, by the one or more processors, into the audio data of the third file, the data representing the tone in the low frequency embedded with the set of data representing the QR Code; and
   broadcasting, by the one or more processors via a speaker, the audio data of the third file, wherein the audio data is received by a device which extracts the set of data representing the QR Code from the low frequency of the audio data of the third file.

2. The method of claim 1, wherein
   the low frequency of the audio data of the third file is attenuated using a high pass filter.

3. The method of claim 2, wherein the high pass filter is configured to attenuate frequencies that are less than or equal to 50 Hz.

4. The method of wherein the set of data representing the QR Code comprises at least one of: a URL link; a digital business card; a graphic; an audio file; and a coupon.

5. The method of claim 1, wherein the attenuated low frequency of the third file, is equal to the data representing the tone in the low frequency with the embedded set of data representing the QR Code.

6. The method of claim 5, wherein the low frequency is less than or equal to 50 Hz.

7. A computer program product comprising:
a computer readable storage medium and program instructions stored on the computer readable storage medium, the program instructions comprising:
program instructions to receive a first file that includes a set of data representing a Quick Response (QR) Code, and a second file that includes audio data
program instructions to generate a third file, that includes the audio data of the second file where a low frequency of the audio data is attenuated, wherein the attenuated low frequency is less than or equal to the low frequency region of the human audio spectrum;
program instructions to embed the set of data representing the QR Code into data representing a tone in the low frequency;
program instructions to insert into the audio data of the third file, the data representing the tone in the low frequency embedded with the set of data representing the QR Code; and
program instructions to broadcast via a speaker, the audio data of the third file, wherein the audio data is received by a device which extracts the set of data representing the QR Code from the low frequency of the audio data of the third file.

8. The computer program product of claim 7, wherein the low frequency of the audio data of the third file is attenuated using a high pass filter.

9. The computer program product of claim 8, wherein the high pass filter is configured to attenuate frequencies that are less than or equal to 50 Hz.

10. The computer program product of claim 7 wherein the set of data representing the QR Code comprises at least one of: a URL link; a digital business card; a graphic; an audio file; and a coupon.

11. The computer program product of claim 7, wherein the attenuated low frequency of the third file, is equal to the data representing the tone in the low frequency with the embedded set of data representing the QR Code.

12. The computer program product of claim 11, wherein the low frequency is less than or equal to 50 Hz.

13. A computer system comprising:
one or more computer processors;
one or more computer readable storage media;
program instructions stored on the one or more computer readable storage media for execution by at least one of the one or more processors, the program instructions comprising:
program instructions to receive a first file that includes a set of data representing a Quick Response (QR) Code, and a second file that includes audio data;
program instructions to generate a third file, that includes the audio data of the second file where a low frequency of the audio data is attenuated, wherein the attenuated low frequency is less than or equal to the low frequency region of the human audio spectrum;
program instructions to embed the set of data representing the QR Code into data representing a tone in the low frequency;
program instructions to insert into the audio data of the third file, the data representing the tone in the low frequency embedded with the set of data representing the QR Code; and
program instructions to broadcast via a speaker, the audio data of the third file, wherein the audio data is received by a device which extracts the set of data representing the QR Code from the low frequency of the audio data of the third file.

14. The computer system of claim 13, wherein
the low frequency of the audio data of the third file is attenuated using a high pass filter.

15. The computer system of claim 14, wherein the high pass filter is configured to attenuate frequencies that are less than or equal to 50 Hz.

16. The computer system of claim 13 wherein the set of data representing the QR code comprises at least one of: a URL link; a digital business card; a graphic; an audio file; and a coupon.

17. The computer system of claim 13, wherein the attenuated low frequency of the third file, is equal to the data representing the tone in the low frequency with the embedded set of data representing the QR Code.

18. The computer system of claim 17, wherein the low frequency is less than or equal to 50 Hz.

* * * * *